(12) United States Patent
Huwiler et al.

(10) Patent No.: US 10,033,311 B2
(45) Date of Patent: Jul. 24, 2018

(54) ACTUATOR WITH A BRUSHLESS TWO-PHASE DC MOTOR

(71) Applicant: Siemens Schweiz AG, Zurich (CH)

(72) Inventors: Adrian Huwiler, Honau (CH); Sacha Soltermann, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 15/519,647

(22) PCT Filed: Sep. 2, 2015

(86) PCT No.: PCT/EP2015/070052
§ 371 (c)(1),
(2) Date: Apr. 17, 2017

(87) PCT Pub. No.: WO2016/066307
PCT Pub. Date: May 6, 2016

(65) Prior Publication Data
US 2017/0244345 A1    Aug. 24, 2017

(30) Foreign Application Priority Data
Oct. 30, 2014   (EP) .................................... 14191163

(51) Int. Cl.
*H02K 29/08*        (2006.01)
*G05B 1/06*         (2006.01)
(Continued)

(52) U.S. Cl.
CPC ............ *H02P 6/16* (2013.01); *H02K 1/2786* (2013.01); *H02K 7/116* (2013.01); *H02K 11/215* (2016.01);
(Continued)

(58) Field of Classification Search
None
See application file for complete search history.

(56) References Cited

U.S. PATENT DOCUMENTS

| 4,710,684 | A | 12/1987 | Okita et al. | ............... 318/400.27 |
| 4,737,674 | A | 4/1988 | Miyao | ........................... 310/268 |

(Continued)

FOREIGN PATENT DOCUMENTS

| DE | 3221048 A1 | 12/1983 | ................ H02P 3/24 |
| EP | 0234663 A1 | 9/1987 | ............. H02K 29/00 |

(Continued)

OTHER PUBLICATIONS

European Search Report, Application No. 14191163.6, 9 pages, dated Apr. 28, 2015.

*Primary Examiner* — Bentsu Ro
*Assistant Examiner* — Zemenay Truneh
(74) *Attorney, Agent, or Firm* — Slayden Grubert Beard PLLC

(57) ABSTRACT

The present disclosure relates to actuators. The teachings thereof may be embodied in an actuator drive for a flap or for a valve for setting a gaseous or liquid volume flow, for example in the heating, ventilation, and/or air conditioning of a building, for a DC motor with a reduction gear connected downstream and a gearbox-side output. The actuator may include: a motor control unit and a voltage supply unit. The motor may be a brushless two-phase DC motor with a stator comprising a quadruple T armature, each armature comprising an armature coil and a radially outward-lying rotor mounted to rotate relative to the stator. Each armature may have precisely four alternating permanent magnetic poles uniformly distributed. The rotor is connected to a spring applying a restoring force to the rotor if the rotor is deflected from a rest position. The motor control unit includes switches for the DC motor and connects the arma- (Continued)

ture coils to the voltage supply unit as a function of a rotational position of the rotor and the armature coils are interconnected in such a way that, when subjected to current excitation, two adjacent armature coils never form magnetic poles having the same polarity.

13 Claims, 4 Drawing Sheets

(51) Int. Cl.
*H02P 6/16* (2016.01)
*H02P 6/08* (2016.01)
*H02K 1/27* (2006.01)
*H02K 11/215* (2016.01)
*H02K 7/116* (2006.01)
*H02H 7/085* (2006.01)

(52) U.S. Cl.
CPC ............... *H02K 29/08* (2013.01); *H02P 6/08* (2013.01); *H02H 7/0851* (2013.01)

(56) References Cited

U.S. PATENT DOCUMENTS

| | | |
|---|---|---|
| 7,138,783 B2 * | 11/2006 | Ran .................. H02H 7/0851 318/653 |
| 8,314,580 B2 | 11/2012 | Grogg et al. ............ 318/400.34 |
| 2005/0001570 A1 | 1/2005 | Lee et al. ................. 318/400.38 |

FOREIGN PATENT DOCUMENTS

| | | | |
|---|---|---|---|
| EP | 2573932 A1 | 3/2013 | ............. G01R 19/00 |
| WO | 2016/066307 A1 | 5/1916 | ................ H02K 1/27 |
| WO | 2005/119898 A2 | 12/2005 | ................ H02P 6/18 |
| WO | 2013/045186 A2 | 4/2013 | ............. G01R 19/00 |

* cited by examiner

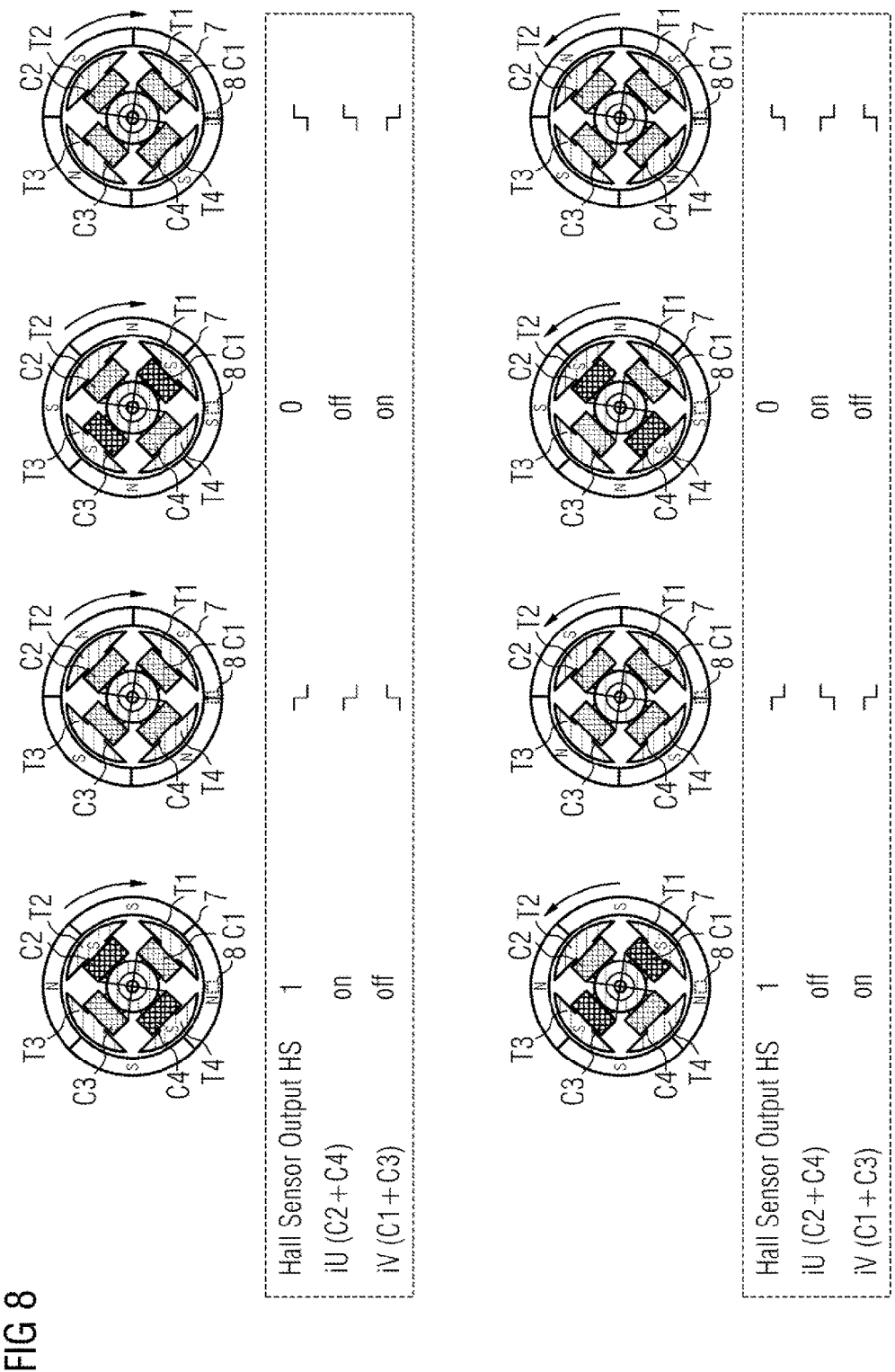

ACTUATOR WITH A BRUSHLESS TWO-PHASE DC MOTOR

CROSS-REFERENCE TO RELATED APPLICATIONS

This application is a U.S. National Stage Application of International Application No. PCT/EP2015/070052 filed Sep. 2, 2015, which designates the United States of America, and claims priority to EP Application No. 14191163.6 filed Oct. 30, 2014, the contents of which are hereby incorporated by reference in their entirety.

TECHNICAL FIELD

The present disclosure relates to actuators. The teachings thereof may be embodied in an actuator drive for a flap or for a valve for setting a gaseous or liquid volume flow, for example in the heating, ventilation, and/or air conditioning of a building.

BACKGROUND

A driver circuit for a brushless DC motor having a stator embodied as a quadruple T armature and having a radially outward-lying rotor with six permanent magnetic poles is known from U.S. Pat. No. 4,710,684.

A brushless single-phase DC motor is known from U.S. Pat. No. 4,737,674. In FIG. 2 of that publication there is a brushless DC motor having a stator embodied as a quadruple T armature and having an outward-lying rotor with four permanent magnetic poles for one direction of rotation only. The T armatures are configured asymmetrically and form an air gap increasing in the circumferential direction with respect to the oppositely disposed rotor to allow self-starting of the motor. Compared to the stator, the rotor is positioned radially outwardly. Furthermore, the rotor is connected to a spring device by means of which a restoring force is applied to the rotor in the event that the latter is deflected from a rest position. The motor control unit has electrically actuated switching means for the DC motor for applying a torque having a predefinable direction of rotation. It is furthermore configured to connect the armature coils to the voltage supply unit by way of the switching means in accordance with the predefined direction of rotation and as a function of a rotational position of the rotor. The rotor of the DC motor is connected to a spring device by means of which a restoring force is applied to the rotor in the event that the latter is deflected from a rest position.

DC motors require a commutation of the phases to take place during operation. The activation of the phases of the DC motor is therefore dependent among other things on the rotational position of a rotor of the DC motor. The commutation causes the phases of the DC motor to be energized with the correct current. The commutation may be realized by means of components known as commutation brushes. Such an embodiment is subject to wear and tear, however. For this reason the commutation is generally performed electronically in the prior art. The rotational position of the rotor may be determined or detected, e.g., by means of devices known as Hall-effect sensors. This principle is described, for example, in the US patent application 2005/0001570 A1.

Further actuators which permit the rotational position of the rotor to be determined without sensors are known from the international publications WO 2005/119898 A2 and WO 2013/045186 A2.

SUMMARY

Starting from the prior art cited in the introduction, the teachings of the present disclosure may provide an actuator which is technically less complex and at the same time more economical. In some embodiments, the actuator has a brushless direct-current (DC) motor, a reduction gear connected downstream of the DC motor and a gearbox-side output for the flap or for the valve. The actuator also comprises a motor control unit for actuating the DC motor and a voltage supply unit. The DC motor has a stator having armature coils as well as a rotor which is mounted to rotate relative to the stator and has four permanent magnetic poles which alternate in the circumferential direction.

Some embodiments may include an actuator for a flap (2) or for a valve for setting a gaseous or liquid volume flow, in particular for the heating, ventilation or air conditioning of a building, having a DC motor (3), having a reduction gear (4) connected downstream, and having a gearbox-side output (5) for the flap (2) or for the valve. The actuator has a motor control unit (10) for actuating the DC motor (3) and a voltage supply unit (20). The DC motor (3) is a brushless two-phase DC motor which has a stator (6) embodied as a quadruple T armature with in each case an armature coil (C1-C4) and a radially outward-lying rotor (7) which is mounted so as to be rotatable relative to the stator (6) and has precisely four alternating permanent magnetic poles (N, S) which are arranged uniformly distributed in the circumferential direction.

The rotor (7) of the DC motor (3) is connected to a spring device by means of which a restoring force is applied to the rotor (7) in the event that the latter is deflected from a rest position. The motor control unit (10) has electrically actuatable switching means (S1, S2; Z1-Z4) as an actuating device for the DC motor (3) in order to apply a torque having a predefinable direction of rotation. The motor control unit (10) is configured to connect the armature coils (C1-C4) to the voltage supply unit (20) by way of the switching means (S1,S2; Z1-Z4) in accordance with the predefined direction of rotation and as a function of a rotational position of the rotor (7). The armature coils (C1-C4) are interconnected in such a way that, when subjected to current excitation, two adjacent armature coils (C1-C4) never form magnetic poles having the same polarity.

Some embodiments include a magnetic field sensor (8) connected for signal transmission or data communication purposes to the motor control unit (10) in order to determine the rotational position of the rotor (7) on the basis of the magnetically sensed permanent magnetic poles (N, S) alternating in the circumferential direction.

In some embodiments, the magnetic field sensor (8) is arranged in such a way that, in the currentless state of the DC motor (3), a respective magnetic field generated by the permanent magnets (N, S) is at a maximum at the location of the magnetic field sensor (8).

In some embodiments, the magnetic field sensor (8) is a digital Hall-effect sensor with switching hysteresis.

In some embodiments, the armature coils (C1-C4) of the T armatures (T1-T4) of the stator (6) are collectively connected in series, wherein the two ends of the series connection form a first and second bridge terminal (X, Y), and the motor control unit (10) has an H-bridge composed of four switching means (Z1-Z4) for current excitation as an actuating device, wherein the H-bridge is connected to a first and second voltage level (GND, VCC) of the voltage supply unit (20) on the input side and to the two bridge terminals (X, Y) on the output side.

In some embodiments, the armature coils (C1, C3; C2, C4) of two oppositely disposed T armatures (T1, T3; T2, T4) of the stator (6) are connected in series in each case or wherein the armature coils (C1, C2; C3, C4) of two adjacent T armatures (T1, T2; T3, T4) and the two remaining armature coils (C3, C4; C1, C2) are connected in series, wherein one end of the series connections in each case forms a common motor terminal (G) and the two remaining ends of the series connections form a first and second differential mode terminal (U, V), and the motor control unit (10) has two switching means (S1, S2) actuatable in push-pull mode as the actuating device, wherein one switching contact of the two switching means (S1, S2) in each case is connected to a first voltage level (GND, VCC) of the voltage supply unit (20), wherein a second voltage level (VCC, GND) is connected to the common motor terminal (G), and wherein the two differential mode terminals (U, V) are connected to the remaining switching contacts of the two switching means (S1, S2).

In some embodiments, the motor control unit (10) has a control device (11) by which the two switching means (S1, S2) may be actuated in clocked mode, wherein the motor control unit (10) has a current measuring device (MI) for a motor current (iM) flowing into the motor terminal (G) and for providing a respective measured current value (IM) for the control device (11), and wherein the control device (11) is configured to perform an SFOC method for determining the rotational position of the rotor (7) by evaluating the respective sensed measured current values (IM).

In some embodiments, the motor control unit (10) has a control device (11) by which the two switching means (S1, S2) may be actuated in clocked mode, wherein the motor control unit (10) has in each case a voltage measuring device (MU) for a respective differential mode voltage (uU, uV) present at the differential mode terminals (U, V) and for providing respective measured voltage values (UU, UV) for the control device (11), and wherein the control device (11) is configured to perform an SBLDC method for determining the rotational position of the rotor (7) by evaluating the respective sensed measured voltage values (UU, UV).

In some embodiments, the motor control unit (10) is configured to reduce the currently set motor current (iM) to a first holding current value (H1) when, given a predefined direction of rotation, a first setpoint rotational position is reached or when no further change in the sensed or determined rotational position of the rotor can be detected.

In some embodiments, the motor control unit (10) is configured to reduce the currently set motor current (iM) step by step if, given a predefined direction of rotation, no further change in the sensed or determined rotational position of the rotor (7) can be detected, and reduce the motor current (iM) to a lowered current value (R) until such time as a change in the rotational position of the rotor (7) is detectable once more, in order then to set the motor current (iM) to a second holding current value (H2) as the sum of the lowered current value (R) plus a safety current value (ΔM).

In some embodiments, the motor control unit (10) is configured to reduce the currently set motor current (iM) step by step when, given a predefined direction of rotation, no further change in the sensed or determined rotational position of the rotor (7) can be detected, reduce the motor current (iM) to a lowered current value (R) until such time as a change in the rotational position of the rotor (7) is detectable once more, and then increase the motor current (iM) until such time as a change in the rotational position of the rotor (7) is detectable once more, in order then to set the motor current (iM) to a second holding current value (H2) as the sum of the lowered current value (R) plus a safety current value (ΔM).

In some embodiments, the motor control unit (10) has a control device (11) by which the switching means (S1, S2; Z1-Z4) may be actuated in clocked mode, wherein the control device (11) is configured to set the motor current (iM) flowing through the armature coils (C1-C4) by means of a superposed pulse-width-modulated actuation of the switching means (S1, S2; Z1-Z4) to a predefined setpoint current value.

In some embodiments, the voltage supply unit (20) has a terminal on the input side for connecting to a power supply network or to an electrical energy store.

In some embodiments, a brushless two-phase DC motor (3) includes rotational position detection for driving a downstream-connected reduction gear (4) for an actuator (1) of a flap (2) or a valve in order to set a gaseous or liquid volume flow, in particular for the heating, ventilation and air conditioning of a building, wherein the DC motor (3) has a stator (6) embodied as a quadruple T armature and having in each case an armature coil (C1-C4) and a radially outward-lying rotor (7) which is mounted so as to be rotatable relative to the stator (6) and has precisely four alternating permanent magnetic poles (N, S) which are arranged uniformly distributed in the circumferential direction, wherein the rotor (7) of the DC motor (3) is connected to a spring device by means of which a restoring force is applied to the rotor (7) in the event that the rotor (7) is deflected from a rest position, and wherein the armature coils (C1-C4) are interconnected in such a way that, when subjected to current excitation, two adjacent armature coils (C1-C4) never form magnetic poles having the same polarity.

BRIEF DESCRIPTION OF THE DRAWINGS

The above-described characteristics, features and advantages of these teachings, as well as the manner in which these are achieved, will become clearer and more readily understandable in connection with the following description of the exemplary embodiments, which are explained in more detail in conjunction with the schematic drawings, in which:

FIG. 8 shows in each case a commutation sequence for driving the DC motor according to FIG. 3 to the right or left while evaluating a sensor signal from a digital Hall-effect sensor with switching hysteresis.

DETAILED DESCRIPTION

Figure 1:
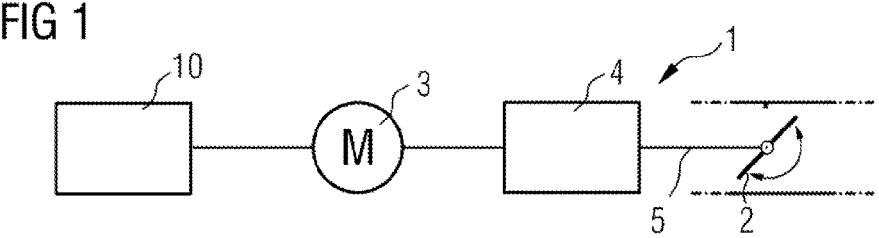
FIG. 1 shows an example of an actuator with motor control unit, DC motor and downstream-connected reducing gear for driving a flap.

Some embodiments of the teachings of the present disclosure use a brushless two-phase DC motor instead of a three-phase brushless DC motor for the actuator. Two-phase DC motors of said type have been in use for a long time and in high volumes in a quite different technical field, namely for driving a PC fan. They are substantially simpler in structure in terms of mechanical design and circuitry layout compared to the three-phase DC motor and can therefore be implemented at lower cost. In spite of their predefined single direction of rotation, such motors may nonetheless be employed for operation in both directions of rotation.

In some embodiments, the DC motor is a brushless two-phase DC motor with a stator embodied as a quadruple T armature and having an armature coil as well as a rotor mounted so as to be rotatable relative to the stator and four permanent magnetic poles alternating in the circumferential direction. The armature coils are interconnected in such a way that when subjected to current excitation, two adjacent armature coils never form magnetic poles having the same polarity. In some embodiments, the motor control unit includes only one or two electrically actuatable switching means per phase as an actuating device for the two-phase DC motor in order to apply a torque having a predefinable direction of rotation, e.g., in total only two or four switching means, respectively.

In contrast, six switching elements are typically required for the three-phase electronic commutation according to the prior art, such as, e.g., in WO 2005/119898 A2 and WO 2013/045186 A2 cited in the introduction.

In some embodiments, the actuator includes a magnetic field sensor connected for signal transmission or data communication purposes to the motor control unit in order to determine the rotational position of the rotor on the basis of the magnetically sensed permanent magnetic poles alternating in the circumferential direction. It is therefore possible to detect four magnetic pole reversals per revolution of the rotor.

In some embodiments, the magnetic field sensor is arranged in such a way that, in the currentless state of the DC motor, a respective magnetic field generated by the permanent magnets is at a maximum at the location of the magnetic field sensor. In the currentless state, e.g., in the state not excited by current, a brushless two-phase DC motor of said type has detent torques in which said motor would remain in the load-free state. The brushless two-phase DC motor may be subject to detent torque. In said four possible rotational positions, the rotor exhibits its energetic minimum with respect to the stator. Instead of the magnetic field sensor, a reed relay may also be used which closes the electrical contact at a magnetic minimum field strength.

If a second magnetic field sensor is arranged in the circumferential direction of the rotor with respect to the first magnetic field sensor, as described in US patent application 2005/0001570 A1, such as e.g. at an angle between 5° and 40°, preferably around 22.5°, then an explicit direction of rotation of the rotor may be determined from the two sensor signals. The magnetic field sensor may in turn be a (hysteresis-free) Hall-effect sensor or a reed relay. Starting from each of said rotational positions, the rotor may then be driven selectively in one of the two predefined directions of rotation by means of suitable current excitation.

In some embodiments, the magnetic field sensor is a digital Hall-effect sensor having switching hysteresis which reverses its digital state according to the detected polarity of the magnetic field, e.g., a north or south pole, and a minimum magnetic field strength. A digital Hall-effect sensor of said type is available e.g., under the type designation US1881 from the company Melexis. Depending on type variant, a Hall-effect sensor of said type switches to the high or low state upon reaching a minimum magnetic field strength and magnetic polarity. This state remains stable after the magnetic field to be detected has been removed. Only when a minimum field strength having opposite polarity is reached, does the switching state then change to the low or, as the case may be, high state. In the currentless state of the motor, said Hall-effect sensor having switching hysteresis should be arranged in the region of the rotor where a respective magnetic field generated by the permanent magnets is at a maximum.

As a result, an explicit direction of rotation of the rotor may be determined by means of only a single magnetic field sensor. By means of suitable current excitation, the rotor can then be driven selectively in one of the two predefined directions of rotation, such as e.g. to start a rotational movement. In some embodiments, optical means e.g., reflective photointerrupters or optical fork sensors, or even rotary encoders, may also be used for detecting the rotational position of the rotor.

In some embodiments, the armature coils of the T armatures of the stator are collectively connected in series. The two ends of the series connection form a first and second bridge terminal. As actuating device, the motor control unit has an H-bridge composed of four switching means for current excitation, wherein the H-bridge is connected to a first and second voltage level of the voltage supply unit on the input side and to the two bridge terminals on the output side. The first voltage level may be the ground potential as reference level. The second voltage level, in contrast, may be a positive supply voltage. In the case of this variant, a simple winding of the four armature coils with a single wire wraps around all four armature coils in turn and while taking account of the winding direction.

In some embodiments, the armature coils of two T armatures of the stator that are disposed opposite one another are connected in series in each case or the armature coils of two adjacent T armatures are connected in series. The two remaining armature coils are likewise connected in series. One end of the series connections in each case forms a common motor terminal and the two remaining ends of the series connections form a first and second differential mode terminal. As actuating device, the motor control unit has two switching means which can be driven in push-pull mode, wherein one switching contact of the two switching means in each case is connected to a first voltage level of the voltage supply unit. A second voltage level is connected to the common motor terminal. The two differential mode terminals are connected to the remaining switching contacts of the two switching means. In the case of this embodiment, there is comparatively low winding overhead of the stator and in the use of just two switching means.

Furthermore, the small number of components required on account of the particularly simple actuation of the two-phase DC motor may also be assembled or placed directly on the interconnect substrate of the motor. This enables the two-phase DC motor to be configured or expanded even for direct operation off an alternating-current voltage rated at 230V or 120V, or off a direct-current voltage rated at 24V.

In contrast, in the prior art according to WO 2005/119898 A2 and WO 2013/045186 A2 cited in the introduction, six switching means are required in conjunction with a significantly higher circuitry and winding overhead for the respective stator disclosed therein, at the same time as a significantly higher circuitry complexity for the actuation of the six switching means.

In some embodiments, there is no need for a series connection composed of two switching means for the electronic commutation together with the doubled ohmic losses associated therewith. As a result, this embodiment delivers a higher efficiency compared to the previous embodiment and compared to the 3-phase actuation of a brushless DC motor described in the introduction.

The switching means in the two previous embodiment variants may comprise switching transistors, e.g., FETs.

In some embodiments, there is a control device by which the two switching means may be actuated in clocked mode. The motor control unit has a current measuring device for measuring a motor current flowing into the motor terminal and for providing a respective measured current value for the control device. The control device may perform an SFOC method for determining the rotational position of the rotor by evaluating the respective detected measured current values. The acronym "SFOC" denotes a mode of sensorless field-oriented control which derives the rotational position of the rotor from a detection of the magnetic fluxes, which are proportional to the sensed currents. This per se known method is also known from the previously cited WO 2013/045186 A2.

In some embodiments, the motor control unit may have a control device by which the two switching means may be driven in clocked mode. The motor control unit has one voltage measuring device in each case for a respective differential mode voltage present at the differential mode terminals and for providing respective measured voltage values for the control device. The control device is configured to perform an SBLDC method for determining the rotational position of the rotor by evaluating the respective acquired measured voltage values. In the case of the "SBLDC" method (SBLDC=Sensorless Brushless Direct Current), the voltages of the DC motor are measured and evaluated. Since one of the two motor phases is in a deenergized state at every time instant during the commutation, said phase may be used for measuring the induced voltage. Based on the characteristic curve of the differential mode voltages, the time instant of the commutation reversal may be estimated and a rotational position of the rotor derived therefrom. This per se known method is likewise known from the publication WO 2013/045186 A2 cited in the introduction.

The control devices may include processor-based microcontrollers. Such a microcontroller may also already have voltage measurement inputs, e.g. analog-to-digital converters, and/or current measurement inputs. The SFOC or SBLDC method may be performed by means of a computer program which maps the SFOC or SBLDC method into suitable program steps and which is then executed on such a microcontroller.

In some embodiments, the motor control unit is configured to reduce the currently set motor current to a first holding current value when, given a predefined direction of rotation—i.e. right or left—a first setpoint rotational position is reached or when no further change in the sensed or determined rotational position of the rotor can be detected, preferably after a waiting time has elapsed. The waiting time typically lies in the range of 0.1 to 1 second. As a result, it is possible to achieve a reduction in the power or current requirement for an actuator of said type.

In some embodiments, the motor control unit reduces the currently set motor current step by step when, given a predefined direction of rotation, no further change in the sensed or determined rotational position of the rotor can be detected. In other words, the rotor remains stationary in spite of the applied torque and runs up against a mechanical end stop. The motor control unit furthermore reduces the motor current to a lowered current value until such time as a change in the sensed or determined rotational position of the rotor is detectable once more, in order then to set the motor current to a second holding current value as the sum of the lowered current value plus a safety current value. In this case the rotor reverses one step backward in the opposite direction of rotation and is then held in said rotational position. As a result it is possible to achieve a more reliable reduction in the power or current requirement for an actuator of said type. In addition, thermally induced changes in the minimum holding current required for the actuator may be taken into account.

In some embodiments, the motor control unit reduces the currently set motor current step by step when, given a predefined direction of rotation, no further change in the sensed or determined rotational position of the rotor can be detected. It furthermore reduces the motor current to a lowered current value until such time as a change in the sensed or determined rotational position of the rotor is detectable once more. In this case the rotor runs back one step in the opposite direction of rotation. Finally, the motor control unit increases the motor current once more until such time as a further change in the rotational position of the rotor can be detected, in order then to set the motor current to a second holding current value as the sum of the lowered current value plus a safety current value.

Compared to the previous embodiment, the rotor, and consequently the actuator, is reset exactly to the first rotational position against the end stop and then held in that position. As previously, a more reliable reduction in the power or current requirement for an actuator of said type is possible in this case too. Thermally induced changes to the required minimum holding current may likewise be taken into account here.

In some embodiments, the motor control unit includes a control device by which the switching means may be actuated in clocked mode. The control device sets the motor current flowing through the armature coils by means of a superposed pulse-width-modulated actuation of the switching means to a predefined setpoint current value. The power or current requirement is reduced once again as a result.

In some embodiments, the voltage supply unit may be a controllable clocked voltage supply unit. It may have a control input, such as e.g. a voltage input or an SPI data interface to regulate to a voltage value predefined by the control device of the motor control unit and to provide the same on the output side at the second voltage level. In this case no superposed pulse-width-modulated actuation of the switching means provided for the commutation is required. The high-frequency alternating current losses in the armature coils of the DC motor are reduced as a result. The voltage supply unit may furthermore have an HF filter on the output side.

In some embodiments, the voltage supply unit has an input-side terminal for connecting to a power supply network. Alternatively or in addition, it has an electrical energy store. This makes it possible to realize an uninterruptible mode of operation of the actuator.

Use of a brushless two-phase DC motor having direction of rotation detection for driving a downstream-connected reduction gear for an actuator of a flap or a valve in order to set a gaseous or liquid volume flow, in particular for the heating, ventilation and air conditioning of a building have a particularly simple design and are very reasonably priced owing to the high volumes in the PC market.

FIG. 1 shows an example of an actuator 1 which has a motor control unit 10 with connected DC motor 3, a downstream-connected reduction gear 4 and an output 5 for a flap 2 for setting a gaseous volume flow, such as for setting an airflow for the heating, ventilation or air conditioning of a building. Alternatively, a valve for setting a liquid volume flow may be connected to the output 5 of the reduction gear 4, such as for setting a water volumetric flow rate.

Figure 2:
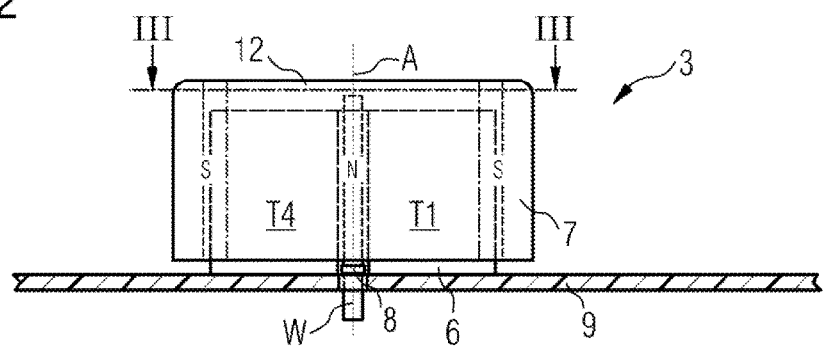
FIG. 2 shows a view of an exemplary brushless two-phase DC motor for use as a drive in an actuator according to the invention.

FIG. 2 shows a more detailed view of an exemplary brushless two-phase DC motor 3 for the advantageous use as a drive in an actuator 1 according to the invention. The two-phase DC motor 3 shown has a stator 6 embodied as a quadruple T armature having four T armatures T1-T4 and a pot-shaped rotor 7 which is mounted to rotate relative to the stator 6. The stator 6 is fixedly arranged on a substrate 9, e.g., on an interconnect substrate. The rotor 7 comprises four permanent magnetic poles N, S alternating in the circumferential direction. The axis of rotation is labeled with the reference sign A, and a shaft fixedly coupled to the rotor 7 is designated by W. In the example of the present figure, the shaft W is mounted in the stator 6 and guided through an aperture in the interconnect substrate 9. The projecting end of the shaft is provided for connecting to a reduction gear. Typically, a toothed wheel arranged on the gear input side and connected in a rotationally fixed manner to the end of the shaft is mounted on said end of the shaft. For clarity of illustration reasons, the toothed wheel itself is not shown. Alternatively, the shaft W may be passed through the front face 12 of the rotor 7 for connection to the reduction gear.

Figure 3:
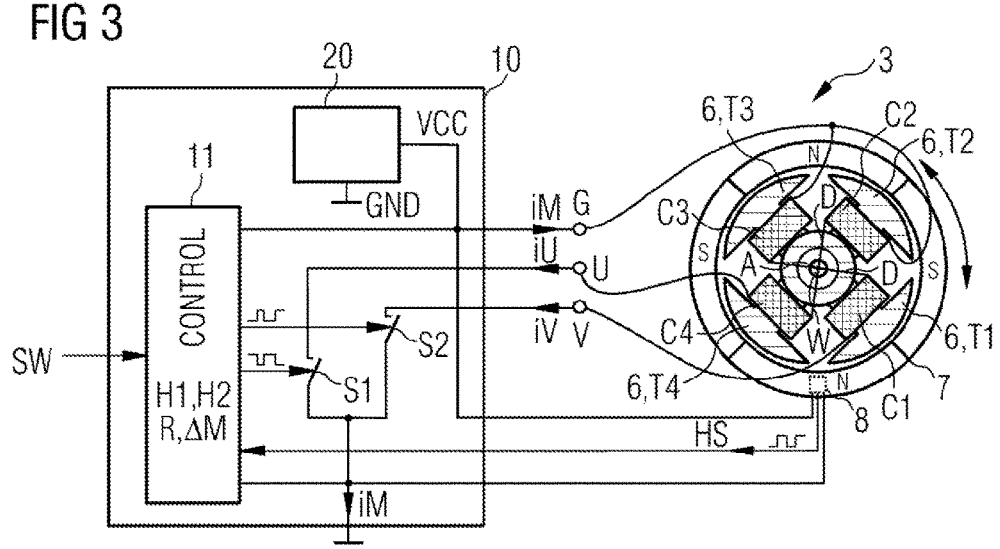
FIGS. 3-4 show the schematic layout of a motor control unit FIG. 5 with two-phase DC motor connected thereto according to a first, second and third embodiment variant, in each case with a magnetic field sensor for detecting the rotational position of the DC motor.

A magnetic field sensor 8 is arranged in the interspace between the top side of the interconnect substrate 9 shown and the underside of the rotor 7 (see FIG. 3). The magnetic field sensor 8 is provided for magnetically detecting the rotational movement of the rotor 7 on the basis of the magnetically sensed permanent magnetic poles N, S alternating in the circumferential direction. The rotational position of the rotor 7 may then be determined on the basis of the sensed alternating magnetic fields.

FIG. 3 shows the schematic layout of a motor control unit 10 with brushless two-phase DC motor 3 connected thereto according to a first embodiment variant.

The motor 3 shown in FIG. 2 can now be seen in the right-hand part of FIG. 3 in a plan view along the intersection line III-III entered in FIG. 2 through the front face 12 or through the pot base of the pot-shaped rotor 7. The stator 6, which is embodied as a quadruple T armature and on which an armature coil C1-C4 is accommodated or wound in each case, can now be seen in detail together with its four T armatures T1-T4. The quadruple T armature 6 may be fabricated from a single piece of magnetic material, such as e.g. from iron or nickel. Alternatively, it may be an axially layered lamination stack composed of many identical metal sheets. "Axial", in this context, refers to directions along the axis of rotation A. In some embodiments, the armature coils C1-C4 are interconnected in such a way that, when subjected to current excitation, two adjacent armature coils C1-C4 never form magnetic poles having the same polarity.

Also seen are the four permanent magnetic poles N, S alternating in the circumferential direction around the axis of rotation A. These are formed mainly on the radial inner face of the pot-shaped rotor 7 and also on the underside of the rotor 7 disposed opposite the interconnect substrate 9 according to FIG. 2. "Radial", in this context, refers to directions toward and away from the axis of rotation A. To detect the rotational movement of the rotor 7, the magnetic field sensor 8 is arranged in such a way that, when the DC motor 3 subject to detent torque is in the currentless state shown here, a respective magnetic field generated by the permanent magnets of the rotor 7 is at a maximum at the location of the magnetic field sensor 8. In the present case, precisely one of the two permanent north poles N of the rotor 7 lies over the magnetic field sensor 8 with maximum magnetic induction there. In the present example, the magnetic field sensor 8 is a digital Hall-effect sensor with switching hysteresis, which changes its digital state according to the detected polarity of the magnetic field, e.g., a north or a south pole, and a minimum magnetic field strength. This provides an explicit direction of rotation of the rotor to be determined by means of just a single such magnetic field sensor 8. The output-side digital sensor signal of the digital Hall-effect sensor 8 with switching hysteresis is designated by HS. Said signal can then be read in by means of the motor control unit 10. The two other electrical connections serve for supplying power to the Hall-effect sensor 8.

In some embodiments, the armature coils C1, C3; C2, C4 of two oppositely disposed T armatures T1, T3; T2, T4 of the stator 6 are connected in series in each case. This is effected here by means of a wire D. After the end of the winding of one of the T armatures with a coil wire, the oppositely disposed T armature is then also wound further. The armature coils C1, C3; C2, C4 are wound according to their winding direction such that, when subjected to current excitation, they all form magnetic poles with the same sign, e.g., north poles or south poles, on the radial outer face of the two T armatures T1, T3; T2, T4. One end of the series connections then forms in each case a common motor terminal G. The two remaining ends of the series connections form a first and second differential mode terminal U, V. The three terminals G, U, V may be routed to a common connector, which can then be plugged onto a corresponding counterpart on the interconnect substrate 9. They may also be soldered directly onto corresponding contact pads on the interconnect substrate 9.

One embodiment of the motor control unit 10 is shown in detail in the left-hand part of FIG. 3. It has a voltage supply unit 20, a control device 11, typically embodied as a microcontroller, and two switching means S1, S2 that are drivable in push-pull mode during operation as the actuating device for the DC motor 3. In this case the switching means S1, S2 are typically switching transistors. One switching contact of the two switching means S1, S2 in each case is connected to a first voltage level GND of the voltage supply unit 20. A second voltage level VCC of the voltage supply unit 20 is connected to the common motor terminal G. Finally, both differential mode terminals U, V are connected to the remaining switching contacts of the two switching means S1, S2. The motor current fed by the voltage supply unit 20 and flowing into the common motor terminal G is designated by iM, which motor current then flows back alternately by way of the two switching means S1, S2 into the first voltage level GND. The two differential mode currents are labeled iU and iV.

A setpoint value for the control device 11 or for the actuator 1 is designated by SW. Said value may be specified externally via a supply line of the actuator 1 or via radio by means of a higher-level control center or controller. Alternatively or in addition, it may be specified by means of a manual switch on the actuator 1. In the simplest case, the setpoint value SW is an on/off command for opening or closing a flap 2 or a valve which is connected to the actuator 1. The setpoint value SW may also be a digital or analog value representing a degree of adjustment of the flap 2 or valve, such as e.g. a value between 0% and 100%, where 0% represents the closed state, 100% the open state, and percentage values therebetween a partially opened or partially closed state of the flap 2 or valve. The control device 11 may have an electrical control input for acquiring the setpoint value SW. In the simplest case, the control input is a digital signal input. The control input may also be embodied as a data interface, such as e.g. as an SPI interface (SPI=Serial Port Interface).

Figure 4:
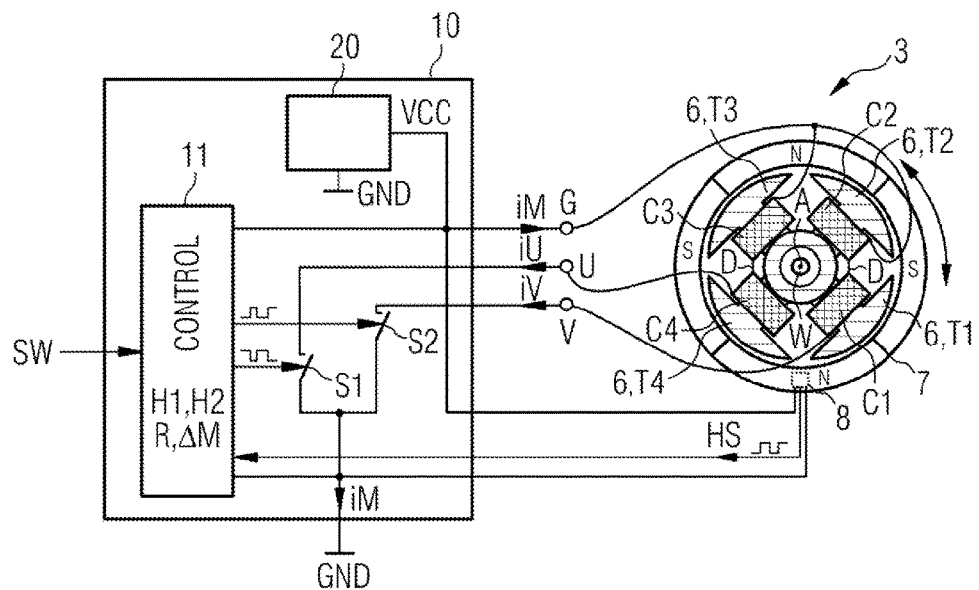

FIG. 4 shows the schematic layout of a motor control unit 10 with connected brushless two-phase DC motor 3 according to a second embodiment. This embodiment variant differs from the previous embodiment variant only in that the armature coils C1, C2; C3, C4 of two adjacent T armatures T1, T2; T3, T4 are now connected in series. The armature coils C1, C2; C3, C4 are wound such that, when subjected to current excitation, they form magnetic poles with different signs, e.g., a north pole and a south pole or a south pole and a north pole, on the radial outer face of the two T armatures T1, T3; T2, T4. The electrical commutation remains unchanged.

Figure 5:
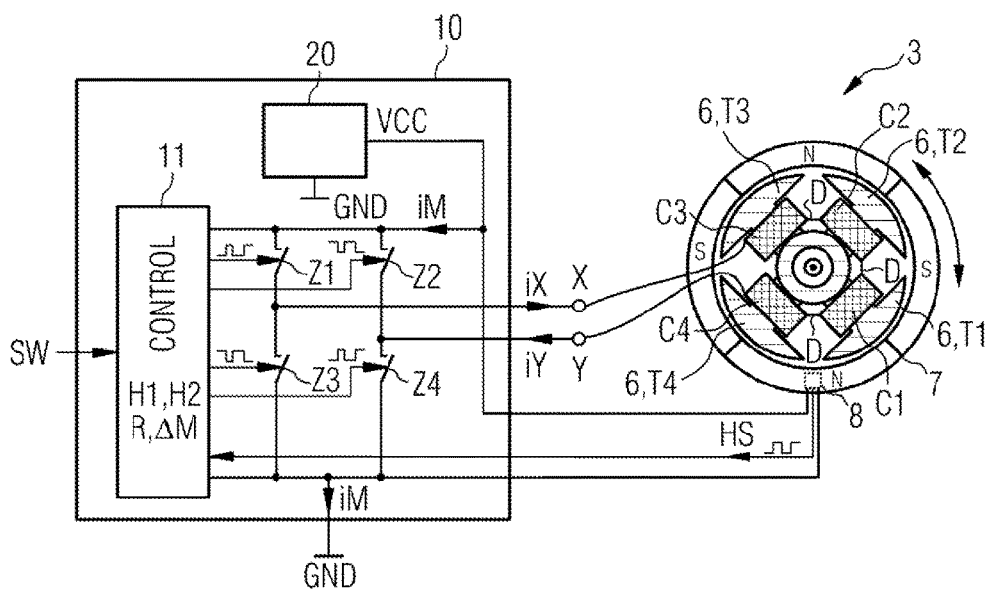

FIG. 5 shows the schematic layout of a motor control unit 10 with connected brushless two-phase DC motor 3 according to a third embodiment. In this case the armature coils C1-C4 of the T armatures T1-T4 of the stator 6 are connected in series. They therefore form an open series connection. The two ends of the series connection form a first and second bridge terminal X, Y. In the present example, the two ends of the series connection are located at the two armature coils C3 and C4. In this case the armature coils C1-C4 are wound such that, when subjected to current excitation, alternating magnetic poles are formed in the circumferential direction of the stator 6 on the radial outer face of the T armatures T1-T4. When the direction of the current excitation is reversed, the signs of the magnetic poles are also inverted.

As actuating device, the motor control unit 10 has an H-bridge composed of four switching means Z1-Z4 for current excitation. An H-shaped bridge of said type is also referred to as a full bridge. The H-bridge is connected to a first and second voltage level GND, VCC of the voltage supply unit 20 on the input side and to the two bridge terminals X, Y on the output side. The associated bridge terminal currents are designated by iX and iY. The electronic commutation is realized in such a way that two switching means Z1, Z3; Z2, Z4 connected in series never close simultaneously during operation. To apply a drive torque to the DC motor 3, the two switching means Z1, Z4 and the two switching means Z2, Z3 are actuated simultaneously (in clocked mode). For a possible braking operation, in order to apply a braking torque to the DC motor 3, the two switching means Z1, Z2 or the two switching means Z3, Z4 may be actuated simultaneously (in clocked mode).

Figure 6:
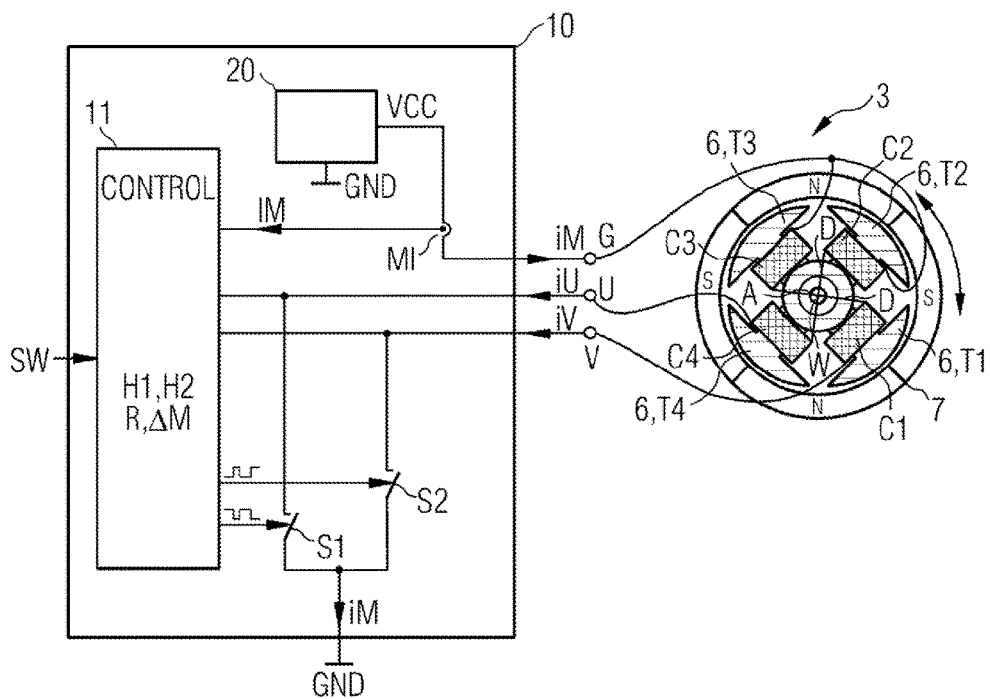
FIG. 6, show the schematic layout of a motor control unit FIG. 7 with sensorless rotational position determination of the connected two-phase DC motor on the basis of an SFOC method and an SBLDC method according to a fourth and fifth embodiment variant.

FIG. 6 shows the schematic layout of a motor control unit 10 with rotational position determination of the connected two-phase DC motor 3 on the basis of an SFOC method according to a fourth embodiment variant. The winding and wiring arrangement of the DC motor 3 corresponds to that of FIG. 3.

For rotational position detection, the motor control unit 10 may include a current measuring device MI for measuring a motor current iM. In the case of a respective closed switching means S1, S2, the motor current iM corresponds to the two differential mode terminal currents iU and iV. The current detection unit MI provides a respective measured current value IM for the control device 11. The current detection unit MI may be e.g. a current transformer and/or a measuring resistor via which a measurement voltage proportional to the motor current iM drops, which measurement voltage may be converted e.g. by means of an A/D converter of the control device 11 into a digital value for further processing. The control device 11 performs the determination of the rotational position of the rotor 7 now by evaluating the respective detected measured current values IM by means of an SFOC method. In this case the rotational position of the rotor 7 may be derived from the detection of the magnetic fluxes in the stator 6, which for their part are proportional to the sensed motor current iM.

Figure 7:
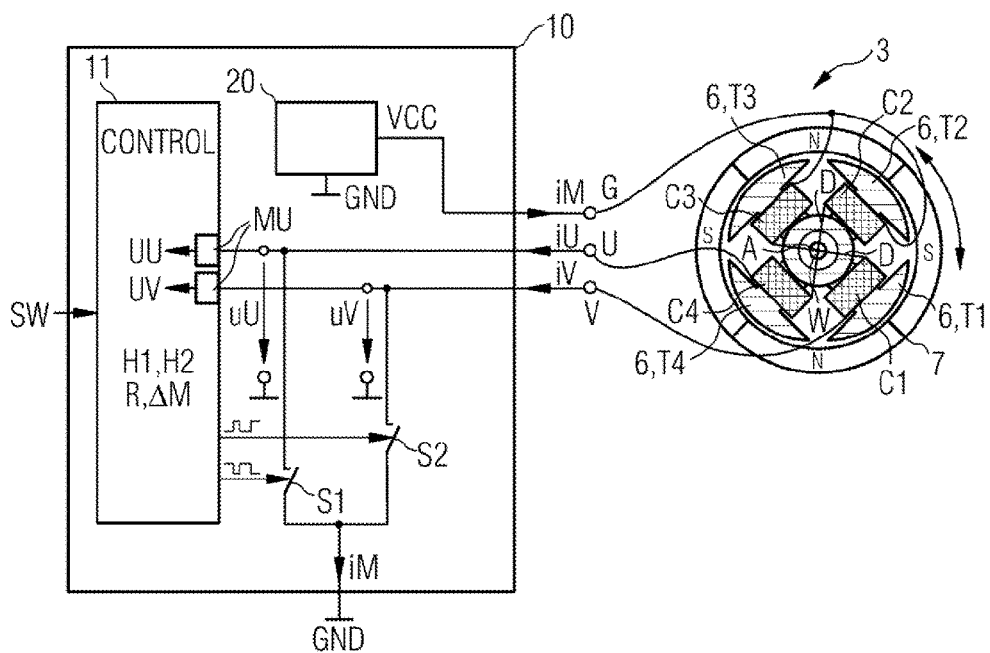

FIG. 7 shows the schematic layout of a motor control unit 10 with rotational position determination of the connected two-phase DC motor 3 on the basis of an SBLDC method according to a fifth embodiment variant. The winding and wiring arrangement of the DC motor 3 corresponds to that according to FIG. 3.

In this embodiment, the motor control unit 10 has two voltage measuring devices MU for the two differential mode voltages uU, uV present at the differential mode terminals U, V. The two voltage measuring devices MU then provide the respective measured voltage values UU, UV for the control device 11. In the simplest case, the two voltage measuring devices MU are realized as input channels of an A/D converter. In this case the control device 11 is configured to perform an SBLDC method to determine the rotational position of the rotor 7 by evaluating the respective acquired measured voltage values UU, UV.

The two previous embodiment variants according to FIG. 6 and FIG. 7 may also be combined with one another. FIG. 8 shows one commutation sequence in each case for actuating the DC motor according to FIG. 3 to the right or left while evaluating a sensor signal HS from a digital Hall-effect sensor 8 with switching hysteresis.

Referring to the upper part of FIG. 8, the electronic commutation may include using the switching means S1, S2 such that the rotor 7 is moved in the clockwise direction. Under the upper four rotational positions of the rotor 7 is plotted the binary value ("1", "0") of the sensor signal HS of the digital Hall-effect sensor 8 with switching hysteresis. Thereunder is plotted the current-excited state "on" or the currentless state "off" of the two series-connected armature coils C2, C4 and C1, C3 in each case. As the sequence in the top part of FIG. 8 shows, the north poles N of the permanent magnetic poles of the rotor 7 in the first and third rotational position are pulled by the intermittent current excitation of the armature coils C2, C4 and then by the intermittent current excitation of the armature coils C1, C3 in the clockwise direction to the corresponding south poles S on the radial outer face of the T armatures T2, T4 and T1, T3, respectively. After the four rotational positions have been passed through in sequence, the process is repeated from the beginning.

Referring to the lower part of FIG. 8, the electronic commutation is realized by way of the switching means S1, S2 such that the rotor 7 is moved in the counterclockwise direction. Under the lower four rotational positions of the rotor 7 is plotted in turn the binary value of the sensor signal HS of the digital Hall-effect sensor 8 with switching hysteresis. Thereunder is plotted once again the current-excited state "on" or the currentless state "off" of the two series-connected armature coils C2, C4 and C1, C3 in each case.

As the sequence in the lower part of FIG. 8 now shows, the north poles N of the permanent magnetic poles of the rotor 7 in the first and third rotational position are pulled by the intermittent current excitation of the armature coils C1, C3 and then by the intermittent current excitation of the armature coils C2, C4 in the counterclockwise direction to the corresponding south poles S on the radial outer face of the T armatures T1, T3 and T2, T4, respectively. After the four rotational positions have been passed through in sequence, the process is repeated from the beginning.

For all three embodiment described in figures FIG. 3 to FIG. 5, the rotor 7 of the brushless two-phase DC motor 3 may be connected to a spring device. A restoring force is applied to the rotor 7 by means of the spring device if the rotor 7 is deflected from a rest position. This enables the actuator 1 to return automatically into a currentless rest state in the event of a power supply failure in order e.g. to close the then connected flap 2 or a valve in a reliable manner.

In like manner for all three above-cited embodiment variants, the motor control unit 10 may reduce the currently set motor current iM to a first holding current value H1 when, given a predefined direction of rotation—e.g., right or left—a setpoint rotational position is reached or when no further change in the sensed or determined rotational position of the rotor 7 can be detected.

The setpoint rotational position may be e.g. a numeric value for the number of revolutions of the DC motor 3 in the one or other direction of rotation or the number of pulses of the digital Hall-effect sensor 8. The number of revolutions or pulses may correspond to a predefined setpoint value SW for the degree of adjustment of the actuator 1. Once said setpoint rotational position is reached, the actuator 1 remains in this position. The first holding current value H1 may be stored in the control device 11 as a digital value.

Alternatively, the currently set motor current iM may be reduced to the first holding current value H1 by means of the motor control unit 10 when, given a predefined direction of rotation, no further change in the sensed or determined rotational position of the rotor 7 can be detected. In this case the actuator 1 has reached a mechanical end stop against which the actuator 1 runs.

In like manner for all three above embodiments according to FIG. 3 to FIG. 5, the motor control unit 10 may reduce the currently set motor current iM step by step if, given a predefined direction of rotation, no further change in the sensed or determined rotational position of the rotor 7 can be detected. In this case too, the actuator 1 has reached a mechanical end stop. The motor control unit 10 is then configured to reduce the motor current iM to a lowered current value R until a change in the rotational position of the rotor 7 is detectable once more, in order then to set the motor current iM to a second holding current value H2 as the sum of the lowered current value R plus a safety current value ΔM. The safety current value ΔM typically lies in a range of 5% to 10% of the lowered current value R. It may be stored in the control device 11 as a digital value, just like the determined lowered current value R and the second holding current value H2.

In like manner for all three above-cited embodiment variants, the motor control unit 10 may be configured to reduce the currently set motor current iM step by step when, given a predefined direction of rotation, no further change in the sensed or determined rotational position of the rotor 7 can be detected. In this case too, the actuator 1 has reached a mechanical end stop. The motor control unit 10 is configured to then increase the motor current iM (again) until such time as a change in the rotational position of the rotor 7 is detectable once more, in order then to set the motor current iM to a second holding current value H2 as the sum of the lowered current value R plus a safety current value ΔM.

Figure 9:
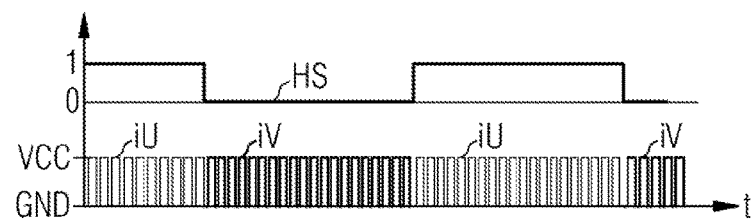
FIG. 9 shows an example illustrating the possible setting of the level of the motor current or the differential mode terminal currents according to FIG. 3 and FIG. 4 by means of superposed pulse-width-modulated actuation.

FIG. 9 shows an example illustrating the possible setting of the level of the motor current iM and/or of the differential mode terminal currents iU, iV according to FIG. 3 and FIG. 4 by means of superposed pulse-width-modulated actuation by way of the switching means S1, S2. The timing of the electronic commutation is predefined by means of the sensor signal HS of the digital Hall-effect sensor 8 with switching hysteresis. The armature coils C2, C4 and the armature coils C1, C3 are subjected to current excitation alternately by the sensor signal HS by means of the differential mode terminal current iU and iV, respectively, which in each case also corresponds to the motor current iM. The current level is set by means of a superposed higher-frequency pulse width modulation. In the present example, the clocking frequency of the pulse width modulation is approximately twenty times as high as the frequency of the sensor signal HS of the Hall-effect sensor 8, this for a currently present rotational speed of the rotor 7. In the present example, the pulse width ratio lies in the range of about 2:1. The set differential mode terminal current iU, UV accordingly has a current value amounting to approx. ⅔ of the maximum possible current value, subject to the assumption of a roughly ohmic behavior of the armature coils C1-C4.

LIST OF REFERENCE SIGNS

1 Actuator, actuator drive
2 Flap
3 Motor, DC motor
4 Reduction gear
5 Output
6 Stator
7 Rotor
8 Magnetic field sensor
9 Interconnect substrate, printed circuit board
10 Motor control unit
11 Control device, microcontroller
12 Front face of the rotor
20 Voltage supply unit, power supply
A Axis of rotation
C1-C4 Armature coils
D Wire connection
G Common motor terminal
GND First voltage level, reference voltage level, ground
HS Hall-effect sensor signal, sensor signal
H1, H2 Holding current value
iM Motor current
IM Measured current value
iU Differential mode terminal current U
iV Differential mode terminal current V
iX Bridge terminal current X
iY Bridge terminal current Y
ΔM Safety current value
MI Current measuring device
MU Voltage measuring device
N, S Permanent magnetic poles
N North pole
R Lowered current value
S South pole
S1, S2; Switching means, switching transistor, FET Z1-Z4
SW Setpoint value, on/off command
t Time
T1-T4 T-armatures U, V Differential mode terminals
uU, uV Differential mode voltage
UU, UV Measured voltage values
VCC Second voltage level
W Shaft
X, Y Bridge terminals

What is claimed is:

1. An actuator for setting a fluid volume flow for a DC motor with a reduction gear connected downstream and a gearbox-side output for the actuator, the actuator comprising:
a motor control unit for the DC motor; and
a voltage supply unit;
wherein the DC motor comprises a brushless two-phase DC motor with a stator comprising a quadruple T armature and a radially outward-lying rotor mounted to rotate relative to the stator;
wherein each armature includes an armature coil;
wherein the radially outward-lying rotor comprises precisely four alternating permanent magnetic poles arranged uniformly distributed in a circumferential direction;
wherein a rotor of the DC motor is connected to a spring applying a restoring force to the rotor if the rotor is deflected from a rest position;
wherein the motor control unit includes electrically actuatable switches for the DC motor to apply a torque having a predefinable direction of rotation;
wherein the motor control unit connects the armature coils to the voltage supply unit by way of the switches in accordance with the predefined direction of rotation and as a function of a rotational position of the rotor; and
wherein the armature coils are interconnected in such a way that, when subjected to current excitation, two adjacent armature coils never form magnetic poles having the same polarity.

2. The actuator as claimed in claim 1, further comprising a magnetic field sensor to determine the rotational position of the rotor on the basis of the magnetically sensed permanent magnetic poles alternating in the circumferential direction.

3. The actuator as claimed in claim 2, wherein the magnetic field sensor is arranged at a maximum point of a respective magnetic field generated by the permanent magnets in the currentless state of the DC motor.

4. The actuator as claimed in claim 2, wherein the magnetic field sensor comprises a digital Hall-effect sensor with switching hysteresis.

5. The actuator as claimed in claim 1, wherein:
the armature coils of the T armatures of the stator are collectively connected in series;
two ends of the series connection form a first and second bridge terminal; and
the motor control unit comprises an H-bridge composed of four switches for current excitation;
wherein the H-bridge is connected to a first and second voltage level of the voltage supply unit on the input side and to the two bridge terminals on the output side.

6. The actuator as claimed in claim 1, wherein:
the armature coils of two oppositely disposed T armatures are connected in series or wherein the armature coils of two adjacent T armatures and the two remaining armature coils are connected in series;
one end of the series connections in each case forms a common motor terminal and the two remaining ends of the series connections form a first and second differential mode terminal; and
the motor control unit includes two switches actuatable in push-pull mode, wherein one switching contact of the two switches in each case is connected to a first voltage level of the voltage supply unit, a second voltage level is connected to the common motor terminal, and the two differential mode terminals are connected to the remaining switching contacts of the two switches.

7. The actuator as claimed in claim 6, wherein the motor control unit comprises:
a control device actuating the two switches in clocked mode; and
a current meter for a motor current flowing into the motor terminal providing a respective measured current value to the control device; and
wherein the control device performs an SFOC method to determine a rotational position of the rotor by evaluating respective sensed measured current values.

8. The actuator as claimed in claim 6, wherein the motor control unit comprises:
a control device actuating the two switches in clocked mode;
a voltage meter for a respective differential mode voltage present at the differential mode terminals and providing respective measured voltage values to the control device; and
wherein the control device performs an SBLDC method to determine a rotational position of the rotor by evaluating the respective sensed measured voltage values.

9. The actuator as claimed in claim 1, wherein the motor control unit reduces the currently set motor current to a first holding current value when, given a predefined direction of rotation, a first setpoint rotational position is reached or when no further change in the sensed or determined rotational position of the rotor can be detected.

10. The actuator as claimed in claim 1, wherein the motor control unit:
reduces the motor current step by step if, given a predefined direction of rotation, no further change in the sensed or determined rotational position of the rotor can be detected, and
reduces the motor current to a lowered current value until a change in the rotational position of the rotor is detected once more, in order then to set the motor current to a second holding current value equal to a sum of the lowered current value plus a safety current value.

11. The actuator as claimed in claim 1, wherein the motor control unit:
reduces the motor current step by step when, given a predefined direction of rotation, no further change in the sensed or determined rotational position of the rotor can be detected;
reduces the motor current to a lowered current value until a change in the rotational position of the rotor is detected once more; and
then increases the motor current until a change in the rotational position of the rotor is detected once more, in order then to set the motor current to a second holding current value equal to a sum of the lowered current value plus a safety current value.

12. The actuator as claimed in claim 1, wherein the motor control unit comprises a control device actuating the switching means in clocked mode, wherein the control device sets the motor current flowing through the armature coils by means of a superposed pulse-width-modulated actuation of the switches to a predefined setpoint current value.

13. The actuator as claimed in claim 1, wherein the voltage supply unit includes a terminal on the input side for connecting to a power supply network or to an electrical energy store.

* * * * *